United States Patent
Bruck et al.

(10) Patent No.: US 9,440,287 B2
(45) Date of Patent: Sep. 13, 2016

(54) COATINGS FOR HIGH TEMPERATURE COMPONENTS

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 153 days.

(21) Appl. No.: 14/460,504

(22) Filed: Aug. 15, 2014

(65) Prior Publication Data
US 2016/0047254 A1    Feb. 18, 2016

(51) Int. Cl.
| | | |
|---|---|---|
| B22F 7/02 | (2006.01) | |
| B22F 7/00 | (2006.01) | |
| F01D 9/02 | (2006.01) | |
| B05D 3/00 | (2006.01) | |
| F01D 5/28 | (2006.01) | |
| C23C 26/02 | (2006.01) | |
| C23C 26/00 | (2006.01) | |
| B23K 10/02 | (2006.01) | |
| B23K 15/00 | (2006.01) | |
| B23K 26/34 | (2014.01) | |
| B23P 6/00 | (2006.01) | |

(52) U.S. Cl.
CPC ............ *B22F 7/002* (2013.01); *B05D 3/007* (2013.01); *B23K 10/027* (2013.01); *B23K 15/0086* (2013.01); *B23K 26/34* (2013.01); *B23K 26/348* (2015.10); *C23C 26/00* (2013.01); *C23C 26/02* (2013.01); *F01D 5/288* (2013.01); *F01D 9/02* (2013.01); *B23K 2201/001* (2013.01); *B23P 6/007* (2013.01); *F05D 2230/31* (2013.01); *F05D 2300/514* (2013.01)

(58) Field of Classification Search
None
See application file for complete search history.

(56) References Cited

U.S. PATENT DOCUMENTS

| | | | |
|---|---|---|---|
| 6,074,737 A | 6/2000 | Jordan et al. | |
| 6,082,444 A | 7/2000 | Harada et al. | |
| 2003/0207155 A1* | 11/2003 | Morrison | B32B 18/00 428/699 |
| 2009/0188097 A1 | 7/2009 | Bruck | |
| 2012/0144958 A1 | 6/2012 | Olson, III et al. | |
| 2012/0202087 A1 | 8/2012 | Bampton | |
| 2013/0136868 A1 | 5/2013 | Bruck et al. | |
| 2013/0140278 A1 | 6/2013 | Bruck et al. | |
| 2013/0140279 A1 | 6/2013 | Bruck et al. | |
| 2013/0142965 A1 | 6/2013 | Bruck et al. | |
| 2013/0316183 A1* | 11/2013 | Kulkarni, Jr. | B23P 6/007 428/557 |
| 2015/0027993 A1* | 1/2015 | Bruck | B23K 26/32 219/73.2 |
| 2015/0224607 A1* | 8/2015 | Bruck | B23K 26/342 219/73.21 |

OTHER PUBLICATIONS

PCT International Search Report mailed Oct. 28, 2015 corresponding to PCT International Application No. PCT/US2015/043703 filed Aug. 5, 2015 (5 pages).

* cited by examiner

*Primary Examiner* — Erma Cameron

(57) ABSTRACT

A method for forming a coating on a substrate is provided. To an assembly 10 including a substrate 12, a porous matrix 14 on the substrate 12, and an impregnating material 16 on or within the porous matrix 14, the method includes applying an amount of energy 18 from an energy source 20 effective to melt the impregnating material 16 and a portion of the substrate. In this way, the impregnating material 16 impregnates the porous matrix 14. The method further includes cooling the assembly 10 to provide a coating 26 comprising the porous matrix 14 integrated with the substrate 12.

18 Claims, 2 Drawing Sheets

COATINGS FOR HIGH TEMPERATURE COMPONENTS

FIELD OF THE INVENTION

This invention relates generally to materials enhancement, and more particularly to processes for providing a strengthening and protective coating on a substrate and to the resulting structures.

BACKGROUND OF THE INVENTION

Structural repair of gas turbine or other superalloy components is commonly recognized as replacing damaged material with matching alloy material and achieving properties, such as strength, that are close to the original manufacture component specifications (e.g., at least seventy percent ultimate tensile strength of the original specification). For example, it is preferable to perform structural repairs on turbine blades that have experienced surface cracks, so that risk of further cracking is reduced, and the blades are restored to original material structural and dimensional specifications. These blades and vanes for land-based power generation and for aerospace applications are typically formed from superalloy materials. The term "superalloy" is used herein as it is commonly used in the art to refer to a highly corrosion-resistant and oxidation-resistant alloy that exhibits excellent mechanical strength and resistance to creep even at high temperatures. Superalloys typically include a high nickel or cobalt content.

Since the development of superalloy materials, various strategies have been employed to provide mechanical strength to the materials to improve the lifetimes thereof during new manufacture or repair. Some elements can provide strength in solid solution. Examples include Co, Cr, Fe, Mo, W, Ta, and Re. Carbide precipitations can also add to strength. Elements forming carbides include W, Ta, Ti, Mo, Nb, Hf and Cr. Most particularly, superalloy materials may be strengthened through the formation of a precipitate phase known as gamma prime. This phase has the basic composition $Ni_3(Al,Ti)$. If properly sized and of sufficient volume fraction, this phase offers significant strengthening—most particularly to nickel based superalloys. Some superalloys are also strengthened by another precipitate known as gamma double prime. This precipitate is of the composition $Ni_3Nb$, and is important for strengthening some nickel and nickel/iron-based superalloys. Gamma prime phases have an ordered crystalline lattice, which aids in providing added strength to the material. In addition, single crystal solidification techniques have been developed for superalloys that enable grain boundaries to be entirely eliminated from a casting, as well as increase the volume fraction of the γ' precipitates. Alternatively, superalloys may be directionally solidified so as to include only longitudinally directed grains for added strength.

Oxide dispersion strengthened (ODS) alloys are also attractive for high temperature use because of their high temperature strength and oxidation resistance. However, such alloys have found limited application in practice because of the difficulties in manufacture including limited formability (especially of complex shapes), limited machinability, weldability, fabricability or repairability. The potential application of such alloys as a layer or coating is even more challenging due to problems with insufficient bonding of ODS materials to substrates.

BRIEF DESCRIPTION OF THE DRAWINGS

The invention is explained in the following description in view of the drawings that show.

DETAILED DESCRIPTION OF THE INVENTION

The present inventors have developed a novel processes for forming a coating comprising a strengthening and protective high temperature network on a substrate. In certain aspects, the processes described herein place a porous matrix comprising a high temperature material, such as a metal oxide, ceramic, or carbon material, on a substrate and thereafter melt an impregnating material on or within the porous matrix to impregnate the porous matrix with the material. The porous matrix does not substantially melt during the process. A portion of substrate, however, is also melted. The material impregnated into the porous matrix is compatible with the substrate. Thus, when the substrate and molten material cools, the porous matrix is fused to the substrate. In this way, a coating comprising a strengthening and protective high temperature network may be formed on the substrate. In an embodiment, a high temperature material such as a metal oxide material is also disposed on the impregnating material or porous matrix, melted, and cooled to form an outer protective layer that integrates with the non-melted porous matrix to expand the strengthening and protective high temperature material network.

Figure 1:
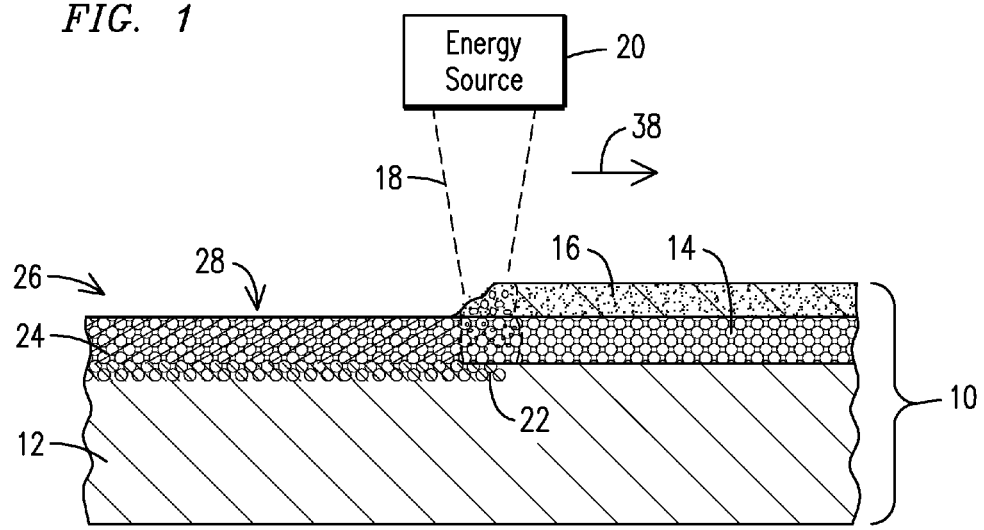
FIG. 1 illustrates the formation of a coating comprising an impregnated porous matrix in accordance with an aspect of the present invention.

Referring to FIG. 1, there is shown an assembly 10 comprising a substrate 12, a porous matrix 14 disposed on the substrate 12, and an impregnating material 16 disposed on or within the porous matrix 14. In an embodiment, the impregnating material 16 is selected so as to be compatible with the substrate 12 upon melting of the impregnating material 16. The porous matrix 14 may be placed on top of the substrate 12 so as to substantially cover a top surface of the substrate 12 in an area to be joined or repaired, or on a desired area in a new manufacture. The impregnating material 16 may then be pre-placed or otherwise fed onto a surface of the porous matrix 14, for example, as a homogeneous layer. Alternatively, the porous matrix 14 may be provided as a pre-form with the impregnating material 16 already placed thereon, which is placed on the substrate 12.

To form a high temperature protective coating, energy 18 is applied to the assembly 10 from a suitable energy source 20 in an amount effective to melt the impregnating material 16 and to melt a portion 22 of the substrate 12. The energy 18, however, does not substantially melt the porous matrix 14 such that the majority (e.g., >50% by volume) of the structural integrity of the porous matrix 14 remains after the application of the energy 18. In this way, the molten impregnating material 16 flows into and impregnates porous matrix 14 to form impregnated porous matrix 24, which remains substantially self-supporting following energy application. It is contemplated that some of the molten material 16 may also diffuse into the melted substrate (portion 22), but it is at least desirable that the molten material 16 interfaces with the melted substrate portion 22.

During the processes described herein, the melted portion 22 of the substrate 12 may have a desired depth such as from 0.05 to 1.0 mm. Upon cooling and solidification, the porous matrix 14 may become integrated with the substrate 12 via the material 16 within the impregnated porous matrix 24 interfacing and solidifying with the molten portion 22 of the substrate, such as by metallurgical bonding or the like. Advantageously, this anchoring may eliminate coating spallation that is typical of conventionally applied coatings on superalloys, for example. Upon solidification, a protective coating 26 comprising a high temperature network 28 is thus formed on the substrate 12.

For the processes described herein, the substrate 12 may comprise any material with which would benefit from the processes described herein. In certain embodiments, the substrate 12 comprises a superalloy material. As noted above, the term "superalloy" is used herein as it is commonly used in the art to refer to a highly corrosion-resistant and oxidation-resistant alloy that exhibits excellent mechanical strength and resistance to creep even at high temperatures. Exemplary superalloys include, but are not limited to alloys sold under the trademarks and brand names Hastelloy, Inconel alloys (e.g. IN 738, IN 792, IN 939), Rene alloys (e.g. Rene N5, Rene 41, Rene 80, Rene 108, Rene 142, Rene 220), Haynes alloys, Mar M, CM 247, CM 247 LC, C263, 718, X-750, ECY 768, 262, X45, PWA 1483 and CMSX (e.g. CMSX-4) single crystal alloys, GTD 111, GTD 222, MGA 1400, MGA 2400, PSM 116, CMSX-8, CMSX-10, PWA 1484, IN 713C, Mar-M-200, PWA 1480, IN 100, IN 700, Udimet 600, Udimet 500 and titanium aluminide.

Alternatively, the substrate 12 may comprise a titanium aluminide material, a cermet material, or a ceramic matrix composite or a monolithic ceramic comprising one or more of alumina, zirconia, silica, silicon carbide, silicon nitride, aluminum nitride, silicon oxynitride, silicon carbonitride, mullite, cordierite, beta spodumene, aluminum titanate, strontium aluminum silicates, lithium aluminum silicates, and combinations thereof.

The porous matrix 14 includes a plurality of pores, such as micropores, therein and is formed at least in part from a material that has a higher melting temperature than at least the impregnating material 16. In this way, the porous matrix 14 may substantially retain its structural integrity even upon application of the energy 18 to melt the impregnating material 16. The porous matrix 14 may be in the form of a filter, a sponge, a honeycomb, or a foam material, for example.

In one embodiment, the porous matrix 14 may comprise a metal oxide selected from the group consisting of alumina, antimony (III) oxide, boria, chromium oxide, cobalt oxide, copper oxide, europium oxide, iron oxide, nickel oxide, silica, tin oxide, titanium oxide, yttrium oxide, zinc oxide, zirconium oxide (zirconia), and combinations thereof. In a particular embodiment, the porous matrix 14 comprises zirconium oxide, which is particularly advantageous as the zirconia has a higher melting point than most superalloy materials. For example, the porous matrix 14 may comprise a zirconia material such as those commercially available from Foseco or Sigma Aldrich, for example. STELEX ZR zirconium oxide filters are commercially available from Foseco in various sizes and have a porosity of from 10-20 ppi (average number of pores per linear inch).

In another embodiment, the porous matrix 14 may instead or further comprise a titanium aluminide material, a cermet material, or a ceramic material. The ceramic material may comprise, for example, alumina, zirconia, silica, silicon carbide, silicon nitride, aluminum nitride, silicon oxynitride, silicon carbonitride, mullite, cordierite, beta spodumene, aluminum titanate, a strontium aluminum silicate, a lithium aluminum silicate, and combinations thereof. Ceramic honeycomb is available for use herein, for example, as Versagrid™ from Applied Ceramics Inc. in fine cell patterns up to 400 cells per square inch and of various materials such as alumina, silica, and Mullite.

In still another embodiment, the porous matrix 14 may instead or further include a carbon material to add structural integrity to the final coating 26. The carbon material may also have a higher melting temperature than the material(s) melted by energy 18. In addition, the carbon material may be formed from a member selected from the group consisting of a fullerene structure, a carbon yarn, a carbon fiber, a carbon fabric, a carbon honeycomb, a carbon nanobud, a graphene structure, a diamond-like material (e.g. a DLC-coated material), and combinations thereof. By way of example, carbon fiber fabrics are commercially available from Protech Composites and a carbon honeycomb is commercially available from Fiber Glast Nomex.

The impregnating material 16 is selected so as to be compatible with the substrate 12 such that when the material 16 is melted by the energy 18, the molten material impregnates the porous matrix 14 and integrates with the molten substrate portion 22 to anchor the matrix 14 to the substrate 12. In an embodiment, the impregnating material 16 comprises a superalloy material as described herein that is compatible with the substrate 12. In another embodiment, the material 16 comprises a titanium aluminide material, a cermet material, or a ceramic material as described herein that is compatible with the substrate 12. The impregnating material 16 may have any suitable size range for the intended application. In an embodiment, the material 16 has a particle size of from 5 to 100 μm.

In an embodiment, the amount of impregnating material 16 is carefully selected so as to impregnate the porous matrix 14 without flooding the porous matrix 14 or spilling over its edges. In certain embodiments, the amount of material 16 is selected to substantially fill the porous matrix 14. For example, in an embodiment, at least 90% of the volume may be filled with molten impregnating material 16. In certain embodiments, the amount of material 16 is selected such that upon melting the material 16 does not completely fill an internal volume of the porous matrix 14 and an amount of porosity remains in the porous matrix 14 after the cooling. This may, in fact, be desirable in certain applications as the remaining porosity could improve thermal properties of the substrate 12. For one, existing gases within the pores or void pockets may prevent additional heat from entering into the porous matrix 14, thereby acting as good thermal barriers and providing added thermal protection to the substrate 12.

In another embodiment, the porous matrix 14 has a non-uniform porosity therethrough such as along a length of the porous matrix 14. Advantageously, a non-uniform porous matrix may enhance travel of the melt through the matrix 14 and/or aid in maintaining an amount of porosity in the matrix 14 even after impregnation as described above.

Figure 2:
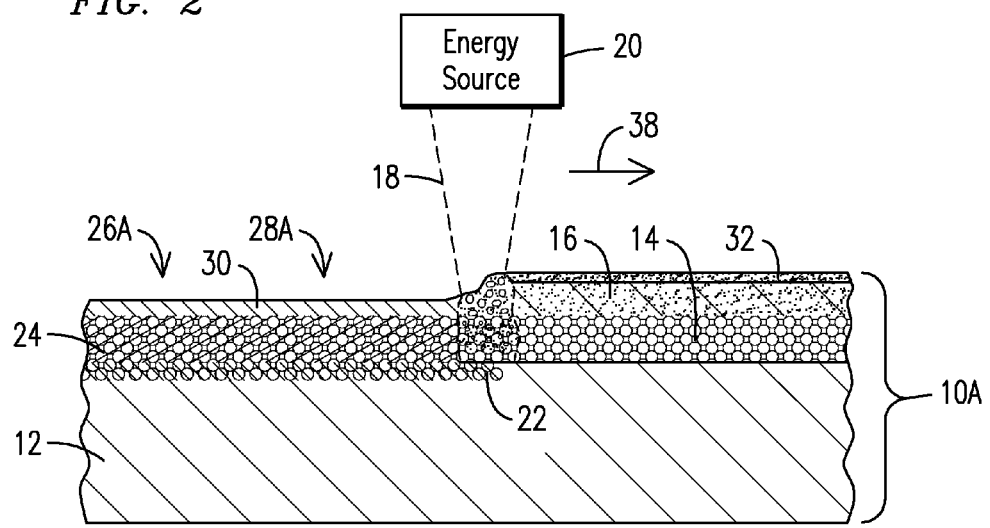
FIG. 2 illustrates the addition of a metal oxide powder to the materials of FIG. 1 to form an outer metal oxide layer on the impregnated porous matrix in accordance with an aspect of the present invention.

Now referring to FIG. 2, there is shown another embodiment wherein the high temperature network 28 of FIG. 1 may be expanded by the addition of an outer protective high temperature layer 30. In an embodiment, the outer protective layer 30 is provided by adding a high temperature material, e.g., a metal oxide powder or a ceramic powder, on the assembly as described above with respect to FIG. 1. In particular, referring to FIG. 2, there is provided an assembly 10A comprising a substrate 12, a porous matrix 14 disposed on the substrate 12, an impregnating material 16 disposed on or within the porous matrix 14, and a high temperature material 32 on the material 16. The high temperature material 32 may be pre-placed or otherwise fed onto the material 16 as layer of uniform or variable thickness. Alternatively, a porous matrix 14 with the impregnating material 16 already placed thereon and/or therein along with the high temperature material 32 may be provided as a pre-form and placed on the substrate 12.

The high temperature material 32 may comprise any suitable material which will provide mechanical strength or high temperature resistance properties to the coating. For example, the material 32 may comprise a metal oxide material, a titanium aluminide material, a cermet material, a ceramic material, and combinations thereof. When a metal oxide material is selected, the metal oxide may comprise a member selected from the group consisting of alumina, antimony (III) oxide, boria, chromium oxide, cobalt oxide, copper oxide, europium oxide, iron oxide, nickel oxide, silica, tin oxide, titanium oxide, yttrium oxide, zinc oxide, zirconium oxide (zirconia), and combinations thereof. In a particular embodiment, the porous matrix 14 comprises zirconium oxide. Alternatively, the material 32 may comprise a titanium aluminide, a cermet material or a ceramic material as was described herein with respect to the porous matrix 14. The high temperature material 32 may be provided in the form of a powder, and in this form may have an average particle size of from 50 to 150 microns.

When subjected to the energy from the energy source 20, the material 32 is provided in a sufficiently thin layer such that it and the material 16 will be melted without substantially melting the porous matrix 14. Upon solidification, the outer layer 30 will form as the outermost layer on the substrate 12. Moreover, since the material 16 flows into and impregnates the porous matrix 14, the molten material 32 may contact the porous matrix 14, solidify, and provide a coating 26A comprising a strengthening and protective high temperature network 28A on the substrate 12 as shown in FIG. 2. In certain embodiments, both the porous matrix 14 and material 32 are of the same composition, such as the same metal oxide composition, to form a metallurgically compatible or otherwise compatible network 28A. In an embodiment, the layer 30 has a final thickness of from 10 microns to 1 mm.

The processes described herein may take place under appropriate flux conditions to shield the molten material(s) from atmospheric oxygen. In certain embodiments, the processes described herein may be performed in a vacuum or in the presence of a flowing stream of argon or other inert gas (over the melt pool which shields the melt pool from atmospheric oxygen.

Figure 3:
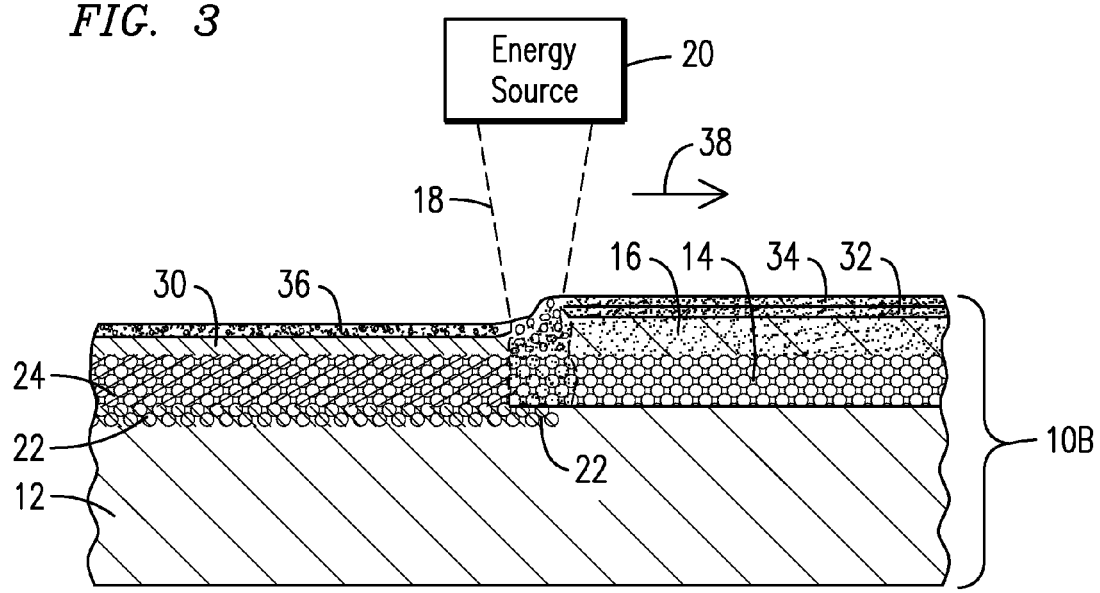
FIG. 3 illustrates the inclusion of a powdered flux to the metal oxide powder to form a slag layer in accordance with an aspect of the present invention.

In other embodiments, a flux powder of a size and composition as described in U.S. Published Patent Application No. 2013/0136868 (the entirety of which is hereby incorporated by reference herein) may be introduced to the process at a suitable point and location to similarly shield the melt pool from atmospheric oxygen. For example, as shown in FIG. 3, a layer of powdered flux material 34 may also be provided to the components of assembly 10A (FIG. 2) to form assembly 10B. The flux material 34 may be pre-placed or fed onto the material 32 or may otherwise be mixed with the material 32 or impregnating material 16. For purposes of illustration, the layer of flux material 34 is shown as a distinct layer from the layer of material 32 and material 16. As the energy 18 melts materials 16, 32, and 34 and the molten material solidifies, a slag layer 36 forms on the outside of the weld in addition to the components already described herein.

The slag layer or slag 36 may be removed using any suitable method known in the art, which will leave the coating 26A and network 28A as was shown in FIG. 2. It is appreciated that the slag 36 is typically a solid layer that is substantially brittle. In certain embodiments, the slag 36 may be broken by mechanical methods, such as by cracking the slag 36 with a blunt object or vibratory tool, and sweeping away the slag 36 from the cladding. In other embodiments, the slag 36 (once formed) may be of such characteristic to self-detach upon cooling.

The use of a flux powder has a plurality of advantages associated therewith including the formation of a layer of slag at a top surface of the melt pool which aids in carrying away contaminants from the melt pool and in itself insulating and controlling heat dissipation, thereby influencing weld pool shape and stresses.

In the processes described herein, the energy source 20 may be any suitable energy source effective to melt the desired materials, e.g., materials 16 plus 32, 34 (if present) and the portion 22 of the substrate 12, but without substantially melting the porous matrix 14 as described above. In an embodiment, the energy source 20 is a laser energy source, although the processes described herein are not so limited. In other embodiments, the energy source 20 may comprise an arc plasma energy source, electron beam or ion beam, for example.

It is appreciated that the skilled artisan would be able to identify the parameters and understand in what manner to vary the parameters so as to provide the intended result such as melting the desired material(s) onto the substrate as well as melt the substrate at a desired rate without substantially melting the porous matrix 14. Such parameters may include but are not limited to power density, pulse duration, pulse intervals, frequency, the number of energy sources, use of hybrid (e.g. plasma and laser) sources, spacing between source and substrate, and the like. In the processes, it is appreciated the energy source 20 may comprise one or more energy sources that may be traversed with respect to the substrate 12 in a direction of the deposit 38 (FIGS. 1-3). Alternatively, the substrate 12 may be traversed with respect to the energy source 20 in the direction of the deposit 38.

In accordance with another aspect, the processes described herein may be further enhanced by the addition of one or more components to any of the materials to be melted (e.g., material 16 and/or material 32), or the additional components may be added layers as distinct layers prior to melting on the substrate 12.

For example, in an embodiment, fluorides such as calcium fluoride could be included for improved fluidity of the molten material during processing.

In another embodiment, carbonates such as barium carbonate or calcium carbonate may be added for further shielding of the melt pool from atmospheric oxygen.

In another embodiment, various other oxides such as calcium oxide, magnesium oxide, or manganese oxide may be added to help eliminate solidification cracking.

In another embodiment, alloying elements including nickel, cobalt, aluminum and/or chromium may be added to improve surface oxidation resistance.

In another embodiment, alumina or further alumina may be added to establish still another coating barrier for corrosion, erosion and oxidation resistance.

The processes described herein may be useful for original equipment manufacturing or for prototyping of parts. Furthermore, the processes described herein may be used for component repair applications on components such as a gas turbine blade or vane that has been removed from service for refurbishing.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What we claim is:

1. A method of coating a substrate comprising:
   to an assembly comprising a substrate, a porous matrix on the substrate, and an impregnating material on or within the porous matrix, applying an amount of energy from an energy source effective to melt the impregnating material and a portion of the substrate such that the impregnating material impregnates the porous matrix; and
   cooling the assembly to provide a coating comprising the impregnated porous matrix integrated with the substrate;
   wherein the porous matrix comprises a material having a higher melting temperature than that of the impregnating material.

2. The method of claim 1, wherein the substrate and the impregnating material comprise a composition selected from the group consisting of a superalloy material, titanium aluminide, a cermet material, and a ceramic material.

3. The method of claim 1, further comprising forming the assembly via:
   disposing the porous matrix on the substrate; and
   disposing the impregnating material on or within the porous matrix.

4. The method of claim 1, wherein the porous matrix comprises a metal oxide selected from the group consisting of alumina, antimony(III) oxide, boria, chromium oxide, cobalt oxide, copper oxide, europium oxide, iron oxide, nickel oxide, silica, tin oxide, titanium oxide, yttrium oxide, zinc oxide, zirconium oxide, and combinations thereof.

5. The method of claim 1, wherein the porous matrix comprises a ceramic material selected from the group consisting of alumina, zirconia, silica, silicon carbide, silicon nitride, aluminum nitride, silicon oxynitride, silicon carbonitride, mullite, cordierite, beta spodumene, aluminum titanate, a strontium aluminum silicate, a lithium aluminum silicate, and combinations thereof.

6. The method of claim 1, wherein the porous matrix further comprises a material selected from the group consisting of a fullerene structure, a carbon yarn, a carbon fiber, a carbon nanobud, a graphene structure, a diamond-like carbon coated material, a carbon honeycomb, a carbon fabric, and combinations thereof.

7. The method of claim 1, further comprising:
   adding a high temperature material to a top of the assembly, wherein the high temperature material is selected from the group consisting of a metal oxide material, titanium aluminide, a cermet material, and a ceramic material;
   melting the high temperature material during the applying an amount of energy from an energy source; and
   cooling the molten high temperature material to form an outer layer therefrom on the coating which is integrated with the porous matrix.

8. The method of claim 7, wherein the high temperature material comprises a metal oxide material selected from the group consisting of alumina, antimony(III) oxide, boria, chromium oxide, cobalt oxide, copper oxide, europium oxide, iron oxide, nickel oxide, silica, tin oxide, titanium oxide, yttrium oxide, zinc oxide, zirconium oxide, and combinations thereof.

9. The method of claim 7, wherein a portion of the impregnating material is melted during the applying an amount of energy from an energy source.

10. The method of claim 7, further comprising:
    adding a flux powder to the assembly; and
    melting the flux powder during the applying an amount of energy from an energy source to form a removable slag layer on the outer layer of the coating.

11. The method of claim 1, wherein the porous matrix has a non-uniform porosity therethrough.

12. The method of claim 1, wherein an amount of porosity remains in the porous matrix after the cooling.

13. A method for forming a coating on a substrate comprising:
    to an assembly comprising a substrate, a porous matrix on the substrate, an impregnating material on or within the porous matrix, and a high temperature material selected from the group consisting of a metal oxide material, titanium aluminide, a cermet material, and a ceramic material on an outer portion of the assembly, applying an amount of energy to the assembly from an energy source,
    wherein the amount of energy is effective to melt the high temperature material, the impregnating material, and a portion of the substrate such that the impregnating material impregnates the porous matrix;
    wherein the porous matrix comprises a material having a higher melting temperature than that of the impregnating material; and
    cooling the assembly to provide a coating comprising a network integrated with the substrate, the network comprising the porous matrix and an outer layer formed from the high temperature material.

14. The method of claim 13, wherein the substrate and the impregnating material comprise a material selected from the group consisting of a superalloy material, titanium aluminide, a cermet material, and a ceramic material.

15. The method of claim 13, further comprising forming the assembly via:
    disposing the porous matrix on the substrate;
    disposing the impregnating material on or within the porous matrix; and
    disposing the high temperature material on the impregnating material.

16. The method of claim 13, wherein the porous matrix and the high temperature material comprise a metal oxide material selected from the group consisting of alumina, antimony(III) oxide, boria, chromium oxide, cobalt oxide, copper oxide, europium oxide, iron oxide, nickel oxide, silica, tin oxide, titanium oxide, yttrium oxide, zinc oxide, zirconium oxide, and combinations thereof.

17. The method of claim 13, wherein the porous matrix and the high temperature material comprise a ceramic material selected from the group consisting of alumina, zirconia, silica, silicon carbide, silicon nitride, aluminum nitride, silicon oxynitride, silicon carbonitride, mullite, cordierite, beta spodumene, aluminum titanate, a strontium aluminum silicate, a lithium aluminum silicate, and combinations thereof.

18. The method of claim 13, wherein an amount of porosity remains in the porous matrix after the cooling.

* * * * *